(12) United States Patent
Aravamudan

(10) Patent No.: US 9,017,585 B2
(45) Date of Patent: Apr. 28, 2015

(54) ORNAMENTATION OF COMPOSITES

(76) Inventor: Gosakan Aravamudan, Bangalore (IN)

(*) Notice: Subject to any disclaimer, the term of this patent is extended or adjusted under 35 U.S.C. 154(b) by 398 days.

(21) Appl. No.: 13/491,623

(22) Filed: Jun. 8, 2012

(65) Prior Publication Data

US 2012/0313281 A1  Dec. 13, 2012

(30) Foreign Application Priority Data

Jun. 9, 2011 (IN) .............. 1956/CHE/2011
Jun. 7, 2012 (IN) .............. 1956/CHE/2011

(51) Int. Cl.
*B29C 47/00* (2006.01)
*B29C 70/48* (2006.01)
*B29C 70/54* (2006.01)
*B29C 70/02* (2006.01)
*B29L 31/00* (2006.01)

(52) U.S. Cl.
CPC .............. *B29C 70/48* (2013.01); *B29C 70/546* (2013.01); *B29C 70/025* (2013.01); *B29L 2031/722* (2013.01)

(58) Field of Classification Search
CPC .................................................. B29C 70/443
USPC ....................................................... 264/73, 74
See application file for complete search history.

(56) References Cited

U.S. PATENT DOCUMENTS 6,660,196 B1 * 12/2003 Iwase et al. ............... 264/73

* cited by examiner

*Primary Examiner* — Galen Hauth
(74) *Attorney, Agent, or Firm* — Ash Tankha; Lipton, Weinberger & Husick

(57) ABSTRACT

A method for decorating a composite placed in a mold in a resin transfer molding process includes selectively depositing unbonded pigments on one or more areas of a preform of the composite, and injecting a resin into the mold via one or more resin input ports operably connected to the mold. The injected resin carries the selectively deposited unbonded pigments on a path on one or more areas of the preform of the composite along a direction of flow of the injected resin, thereby creating ornamental pigment flow patterns in the composite for decorating the composite. The method also creates bands of ornamental pigment flow patterns by depositing the unbonded pigments on a transfer medium positioned on the composite, positioning the transfer medium in proximity to the resin input ports, and selectively injecting the resin onto the transfer medium deposited with the unbonded pigments, via the resin input ports.

7 Claims, 5 Drawing Sheets

ORNAMENTATION OF COMPOSITES

CROSS REFERENCE TO RELATED APPLICATIONS

This application claims the benefit of the following patent applications:

1. Provisional patent application number 1956/CHE/2011 titled "Ornamentation Of Composites", filed on Jun. 9, 2011 in the Indian Patent Office.

2. Non-provisional patent application number 1956/CHE/2011 titled "Ornamentation Of Composites", filed on Jun. 7, 2012 in the Indian Patent Office.

The specifications of the above referenced patent applications are incorporated herein by reference in their entirety.

BACKGROUND

The method disclosed herein, in general, relates to manufacturing building structures. More particularly, the method disclosed herein relates to creating a decorative architectural material for furniture and building structures.

There is a long felt but unresolved need for a method for decorating composites, for example, engineered quartz composites, with decorative pigments by creating natural looking flow patterns.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method disclosed herein addresses the above stated need for decorating a composite, for example, a laminate. An example of a laminate is a thin quartz stone laminate with a fiber backing, such as the artificial stone laminate disclosed in co-pending patent application number 2405/CHENP/2012 filed on 15 Mar. 2012 in the Indian Patent Office. Another example of a laminate is a fiber reinforced plastic sheet. Another example of the composite is an artificial stone fiber composite comprising quartz particulates, glass particulates, fillers, and a polyester binder.

The method disclosed herein decorates a composite placed in a mold by creating decorative patterns using pigments in the composite using resin transfer molding. As used herein, the term "pigments" refers to any material that creates a visual contrast, for example, color pigments, mica, small reflective particles that can be carried by a resin, phosphorescent pigments, metallic pigments, or any material that imparts color or contrast in areas on the composite to create patterns or designs. The method disclosed herein is applicable for both resin transfer molding and vacuum assisted resin transfer molding.

In the method disclosed herein, unbonded pigments are selectively deposited on one or more areas of a preform of the composite. The resin is injected into the mold via one or more resin input ports operably connected to the mold. The injected resin carries the selectively deposited unbonded pigments on a path on one or more areas of the preform of the composite along a direction of flow of the injected resin, thereby creating ornamental pigment flow patterns in the composite for decorating the composite.

In an embodiment, the resin is selectively injected into the mold with one or more different types of pigments at single or different points of time. The flow of the pigments in the composite creates aesthetically attractive ornamental pigment flow patterns defined by different shades and colors of the pigments, as well as transitional colors resulting from a mix of different types of pigments.

In another embodiment, multiple resin input ports are selectively positioned in different areas over the composite in the mold for colored resin introduction. In this embodiment, the resin is selectively injected into the mold via the selectively positioned resin input ports for creating differently colored and shaped ornamental pigment flow patterns in the composite.

In another embodiment, one or more vacuum ports are selectively positioned over the composite in the mold. A vacuum is selectively applied through the selectively positioned vacuum ports during the flow of the injected resin that carries the selectively deposited unbonded pigments on the path on one or more areas of the preform of the composite, for creating different ornamental pigment flow patterns in the composite. The application of the vacuum through the vacuum ports pulls the injected resin that carries the selectively deposited unbonded pigments and enables creation of differently shaped and ornamental pigment flow patterns of the colored resin.

In another embodiment, prior to resin introduction, selective areas of the composite are surface covered with pigments with varied degrees of pigment concentration per unit area. The pigments in these selective areas are loosely adhered to the surface of the composite material in those areas of the composite. Hence, when the resin passes or flows through these selective areas of the composite, the resin carries the pigment in areas proximal to those areas and creates design patterns in proximity to those areas. The methods used for selectively depositing a coloring material, for example, inorganic color pigments, organic color pigments, phosphorescent pigments, metallic pigments, or any material that imparts color or contrast in one or more areas of the composite to create patterns or designs comprise, for example, placing a stencil with patterns and designs on the composite and spraying a resin or a solvent carrier mixed with the coloring material over the stencil for selectively coloring areas of the composite.

In another embodiment, bands of ornamental pigment flow patterns are created in the composite, for example, by depositing the unbonded pigments on a transfer medium, for example, a glass fiber strip, positioned on the preform of the composite, positioning the transfer medium in proximity to one or more resin input ports operably connected to the mold, and selectively injecting the resin onto the transfer medium deposited with the unbonded pigments, via the resin input ports for creating the ornamental pigment flow patterns in the form of bands. Ornamentation in the form of bands is created in the composite after flow of the resin.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
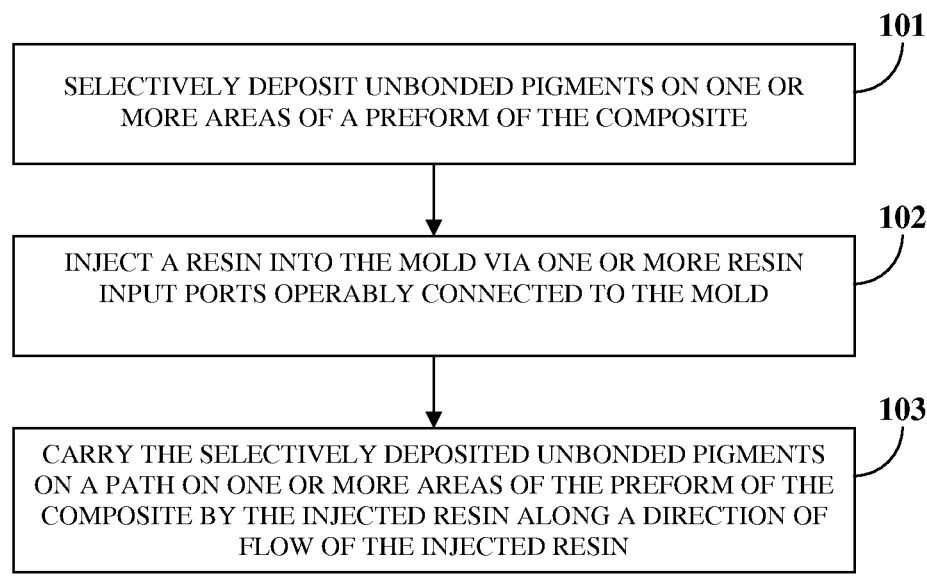
FIG. 1 illustrates a method for decorating a composite placed in a mold in a resin transfer molding process.

FIG. 1 illustrates a method for decorating a composite placed in a mold in a resin transfer molding process. An example of a composite is a laminate. An example of a laminate is a thin quartz stone laminate with a fiber backing. In another example, the composite is an artificial stone fiber composite comprising quartz particulates, glass particulates, fillers, and a polyester binder. The thin quartz stone laminate or the artificial stone fiber composite is, for example, a 2 mm thin quartz stone sheet comprising a quartz top layer, a glass fiber rear layer, and a polyester resin binder. Another example of a laminate is a fiber reinforced plastic sheet such as a glass fiber sheet impregnated with a polyester resin.

In the method disclosed herein, unbonded pigments are selectively deposited 101 on one or more areas of a preform of the composite prior to injection of a resin. As used herein, the term "pigments" refers to any material that creates a visual contrast, for example, color pigments, mica, small reflective particles that can be carried by a resin, phosphorescent pigments, metallic pigments, or any material that imparts color or contrast in areas on the composite to create patterns or designs. Unbonded pigments are pigments that loosely attach to the surface of the material in the preform of the composite. For example, inorganic powder pigments are loosely held on the surfaces of quartz particles, when a mixture of the inorganic powder pigments suspended in a carrier are sprayed on the quartz particles. The carrier is then vaporized to leave the inorganic powder pigments on the surfaces of the quartz particles. An example of an inorganic pigment is an iron oxide pigment, and an example of a carrier is styrene.

After selective deposition of the unbonded pigments on one or more areas of the preform of the composite, a resin, for example, an orthophthalic polyester resin, a polyvinyl resin, an epoxy resin, or an acrylic resin, is injected 102 into the mold via one or more resin input ports operably connected to the mold. The injected resin carries 103 the selectively deposited unbonded pigments on its path on one or more areas of the preform of the composite along a direction of flow of the injected resin, thereby creating ornamental pigment flow patterns in the composite for decorating the composite. The method disclosed herein creates decorative patterns using pigments in composites using resin transfer molding. The method disclosed herein is applicable for both resin transfer molding without a vacuum and also for vacuum assisted resin transfer molding. In an embodiment, a vacuum is applied to the mold prior to the injection of the resin for enabling a process of vacuum assisted resin transfer molding.

Figure 2:
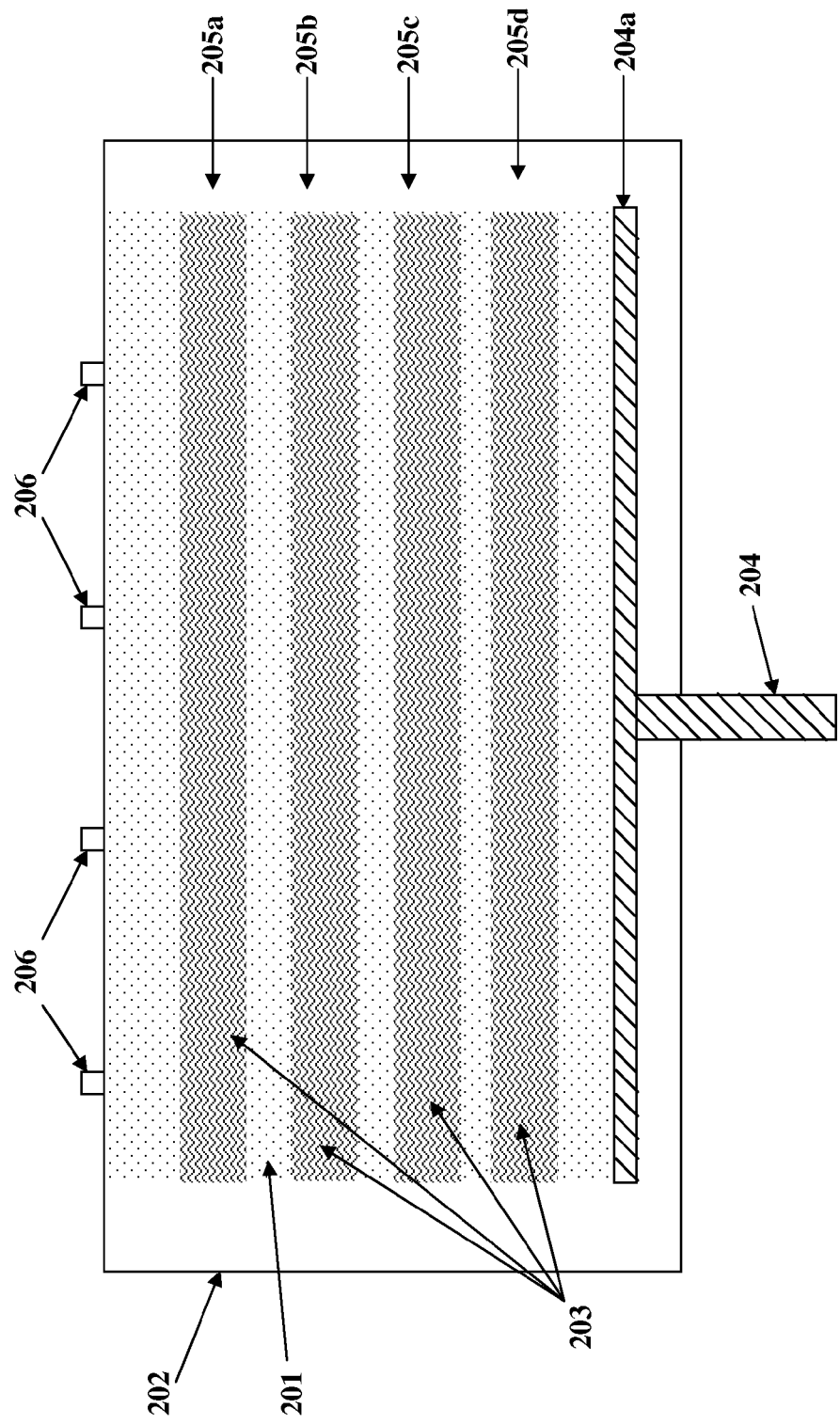
FIG. 2 exemplarily illustrates a top cutaway sectional view showing ornamental pigment flow patterns created in a composite, after a resin premixed with pigments is selectively injected in batches into a mold at one or different points of time.

In an embodiment, the resin is premixed with pigments and then selectively injected into the mold at one or different points of time. FIG. 2 exemplarily illustrates a top cutaway sectional view showing ornamental pigment flow patterns 205a, 205b, 205c, and 205d created in the composite 201, after the resin premixed with the pigments 203 is selectively injected in batches into the mold 202 at one or different points of time. Attractive transitional colors in the composite 201 may result from the mix of pigments 203 during flow of the resin.

In another embodiment, one or multiple resin input ports 204 are selectively positioned over the composite 201 in the mold 202. As exemplarily illustrated in FIG. 2, a single resin input port 204 is positioned over the composite 201 in the mold 202. The resin input port 204 extends into a resin input channel 204a within the mold 202. The resin input channel 204a creates a path for efficient distribution of the resin on the composite 201. The resin is selectively injected into the mold 202 via the selectively positioned resin input ports 204 for creating differently shaped ornamental pigment flow patterns 205a, 205b, 205c, and 205d of colored resin in the composite 201. In an embodiment, multiple resin input channels 204a are selectively positioned over the composite 201 in the mold 202 for selectively distributing the resin on the composite 201 and enabling creation of different shapes and patterns of the colored resin.

In an embodiment, one or more vacuum ports 206 are selectively positioned over the composite 201 in the mold 202. In this embodiment, a vacuum is selectively applied through the selectively positioned vacuum ports 206 during the flow of the injected resin that carries the selectively deposited unbonded pigments 203 on the path on one or more areas of the preform of the composite 201, for creating differently shaped ornamental pigment flow patterns of colored resin in the composite 201.

Figure 3:
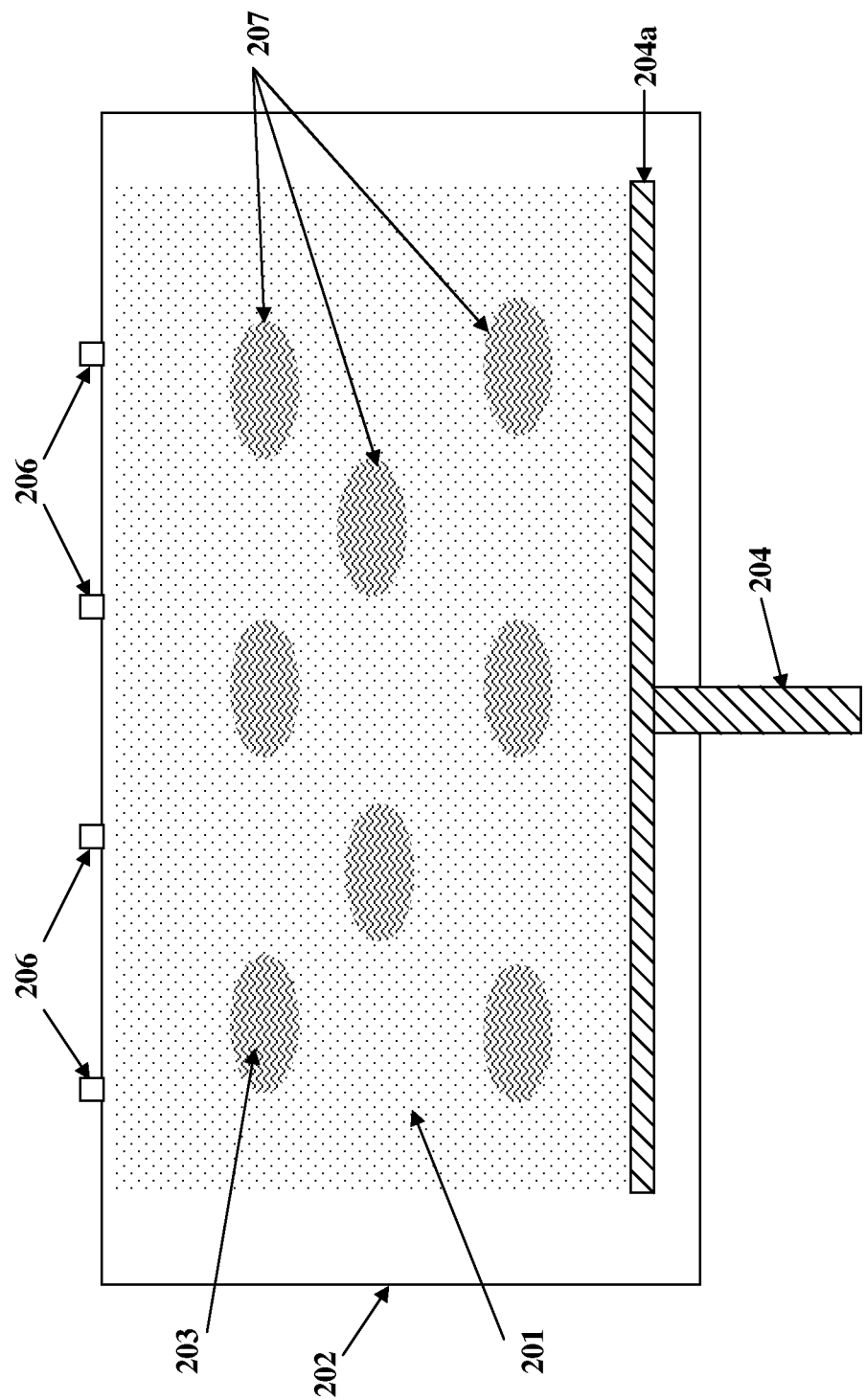
FIG. 3 exemplarily illustrates a top cutaway sectional view showing ornamental pigment flow patterns created in a composite by selectively depositing pigments on one or more areas of a preform of the composite.

FIG. 3 exemplarily illustrates a top cutaway sectional view showing ornamental pigment flow patterns created in the composite 201 by selectively depositing pigments 203 on one or more areas 207 of a preform of the composite 201. In the selective deposition method disclosed herein, selective areas 207 of the composite 201 are surface covered with pigments 203 with varied degrees of pigment concentration per unit area. The pigments 203 in these selective areas 207 are loosely adhered to a surface of the material of the composite 201. Therefore, when the resin passes through the selective areas 207, the resin carries the pigments 203 in areas of proximity to the selective areas 207 and creates design patterns in proximity to the selective areas 207.

Figure 4:
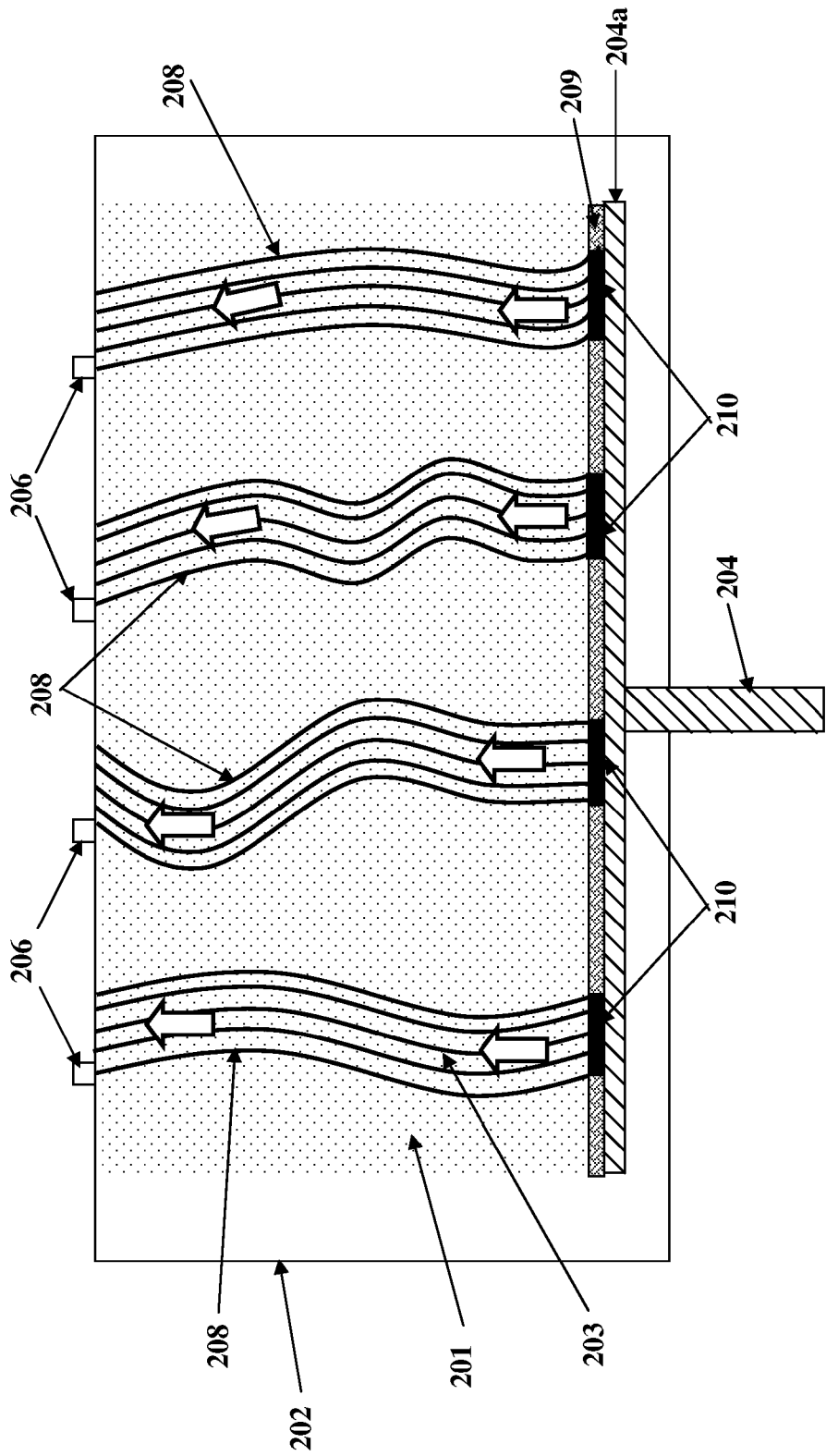
FIG. 4 exemplarily illustrates a top cutaway sectional view showing ornamental pigment flow patterns created in the form of bands in the composite.

FIG. 4 exemplarily illustrates a top cutaway sectional view showing ornamental pigment flow patterns created in the form of bands 208 in the composite 201. In an embodiment, unbounded pigments 203 are deposited on a transfer medium 209, for example, a glass fiber strip positioned on the preform of the composite 201. The transfer medium 209 is then positioned in proximity to a resin input port 204 operably connected to the mold 202. The resin 210 is selectively injected onto the transfer medium 209 deposited with the unbonded pigments 203, via the resin input port 204. The resin 210 enters the resin input channel 204a, contacts and carries the unbounded pigments 203 that are deposited on the transfer medium 209, and flows in directions represented by block arrows in FIG. 4, for creating the bands 208 of ornamental pigment flow patterns of colored resin 210. If a vacuum is applied to the mold 202, the pigments 203 in the form of bands 208 are carried all the way to the area in proximity to the vacuum ports 206 or outlets.

Figure 5:
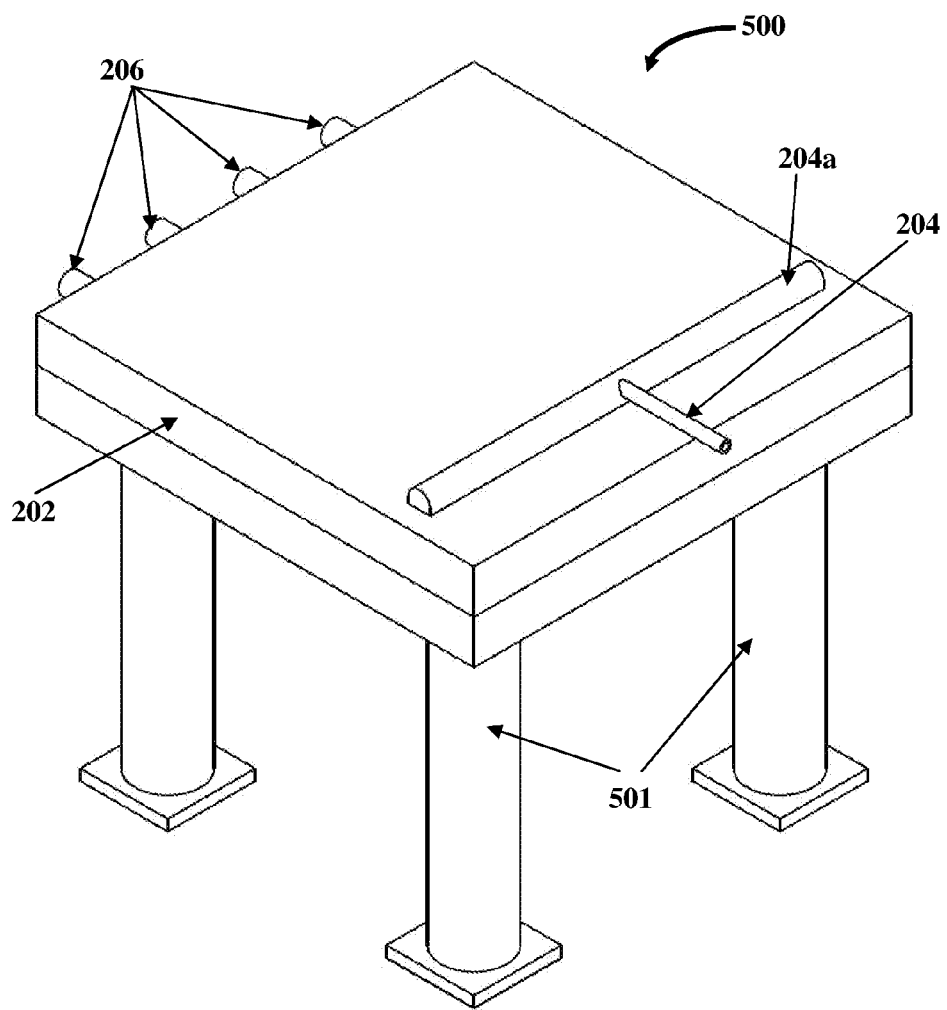
FIG. 5 exemplarily illustrates a front perspective view of an apparatus for decorating a composite placed in a mold in a resin transfer molding process.

FIG. 5 exemplarily illustrates a front perspective view of an apparatus 500 for decorating a composite 201, exemplarily illustrated in FIGS. 2-4, placed in a mold 202 in a resin transfer molding process. The mold 202 containing the composite 201 is positioned on a support structure 501. A resin input port 204 is operably connected to the mold 202 for injecting a resin 210 into the mold 202 as exemplarily illustrated in FIG. 4. The resin input port 204 extends into a resin input channel 204a within the mold 202. The resin input channel 204a creates a path for efficient distribution of the resin 210 on the composite 201 as exemplarily illustrated in FIG. 4.

The following manufacturing process exemplarily illustrates creation of ornamental pigment flow patterns in a composite 201 in a vacuum assisted resin transfer molding process. A composite material is placed in a vacuum bag that contains the mold 202 with a resin input port 204 or inlet, a vacuum port 206 or outlet, and a resin input channel 204a exemplarily illustrated in FIG. 5. In this example, the composite 201 is a decorative artificial stone laminate with a rear layer of reinforcing fibers backing a top layer of transparent or translucent particulates. The top layer of particulates of the decorative artificial stone laminate comprises, for example, quartz particles. The particulates comprise, for example, one or more of quartz particulates, metal pieces, transparent particulates coated with metal and colored glass, etc., or any combination thereof. The reinforcing fibers comprise, for example, glass fibers. Unbonded pigments 203 are deposited on a transfer medium 209, for example, a glass fiber strip positioned on a preform of the composite 201 as exemplarily illustrated in FIG. 4. The transfer medium 209 is then positioned in proximity to the resin input port 204 operably connected to the mold 202. During flow of the resin 210 injected onto the transfer medium 209 from the resin input port 204, ornamental pigment flow patterns in the form of bands 208 are created in the composite 201 as exemplarily illustrated in FIG. 4.

In one type of pigment ornamentation as exemplarily illustrated in FIG. 4, when an orthophthalic polyester resin 210 is injected onto the transfer medium 209 via the resin input port 204, the resin 210 carries the pigment 203 deposited on the transfer medium 209, thereby creating the ornamental pigment flow patterns in the form of bands 208.

In another type of pigment ornamentation as exemplarily illustrated in FIG. 2, at the start of the manufacturing process, an orthophthalic polyester resin with a first color pigment 203 is introduced into the mold 202 via the resin input port 204, and after a predetermined period, an orthophthalic polyester resin with a second color is introduced into the mold 202 via the resin input port 204. Similarly, multiple introductions of colored resins at different points in time can be conducted over an entire period of resin impregnation in the composite 201. These differentially pigmented flow fronts create multiple different design ornamental pigment flow patterns 205a, 205b, 205c, and 205d in the composite 201.

The resin, for example, a polyvinyl resin, an epoxy resin, an acrylic resin, etc., with or without a filler may also be used in the composite 201. The composite 201 used herein is, for example, a decorative artificial stone laminate comprising a visually decorative and functional surface covering. The decorative artificial stone laminate is required to be thin and flexible to be used as an architectural surface covering. The artificial stone laminate is a thin layer of particulates held by a binder, that is, a resin. The artificial stone laminate is lightweight and visually appeasing. Furthermore, since the artificial stone laminate requires no more than a thin layer of particulates, there is substantial reduction, for example, in cost, thickness, and weight resulting in a thin lightweight artificial stone laminate.

Consider an example of creating ornamental pigment flow patterns in a composite 201, where selective areas 207 of the composite 201 have pigments 203 loosely adhered to the composite 201 prior to resin introduction as exemplarily illustrated in FIG. 3. Disclosed herein is a method of ornamentation of an artificial stone laminate, for example, a quartz resin composite 201. In the manufacturing process, transparent or translucent particulates, for example, quartz particles are deposited in a substantially thin layer of, for example, about 2 mm, on a release surface. A coloring material, for example, color pigments 203 or any material that imparts color and/or contrast is selectively deposited on areas 207 on the quartz particles to create patterns or designs. The pigments 203 in these selective areas 207 are loosely adhered to the surfaces of the quartz particles on those areas 207. Therefore, when the resin passes through the selective areas 207, the resin carries the pigments 203 in areas of proximity to the selective areas 207 and creates design patterns in proximity to the selective areas 207. In an example, the following method is used for selectively depositing a coloring material, for example, color pigments, phosphorescent pigments, metallic pigments, or any material that imparts color or contrast in one or more areas 207 of the composite 201 to create patterns or designs. A stencil with patterns and designs is placed on the composite 201. A resin or a solvent carrier mixed with the coloring material is sprayed over the stencil for selectively coloring areas 207 of the composite 201. A layer of reinforcing fibers, for example, glass fibers, may be placed on the thin layer of quartz particles.

After the quartz resin composite 201 cures, the quartz particles are polished to expose a flat, transparent or translucent surface of the quartz particles that have been selectively colored by the coloring material to create visual patterns or designs. A single size for each of the particulates is chosen, for example, between about 0.5 mm and about 3 mm. The size of the particulates is chosen, for example, in the range of about 1.05 mm to about 1.95 mm. The particulates are, for example, quartz particulates, or one or more of a combination of quartz particulates, metal pieces, and transparent particulates coated with metal and colored glass. The particulates used are, for example, transparent quartz particulates.

The reinforcing fibers comprise, for example, glass fibers. The reinforcing fibers are, for example, a composite material made of a polymer matrix reinforced with fibers. The fibers are, for example, fiberglass, carbon, or aramid, while the polymer is, for example, an epoxy, a vinyl ester, or a polyester thermosetting plastic. The rear layer of reinforcing fibers is, for example, a chopped glass fiber mat. The layer of reinforcing fibers comprises, for example, one or more of glass fibers, polyester fibers, ceramic fibers, carbon fibers, aramid fibers, organic fibers, etc.

Furthermore, the translucent or transparent particulates further comprise particles, for example, quartz, glass, and other decorative particles and objects. For the purpose of ornamentation, even a small amount of opaque particles such as metal, ceramic, stone, semiprecious stones, etc., may be deposited on a release surface along with the translucent or transparent particulates.

The resin is, for example, a polyester resin with a filler, epoxy or an acrylic resin, etc. The resin binder used for filling gaps between the particulates and for binding the reinforcing fibers to the particulates is, for example, a thermoset plastic such as an orthophthalic polyester resin, along with a filler. An example of a polyester resin is a combination of ortho neo pentyl glycol and styrene. Another example of a polyester resin is a combination of isophthalic neo pentyl glycol, methyl methyl acrylate, and styrene. Room temperature catalysts, for example, methyl ethyl ketone peroxide (MEKP) and room temperature accelerators may be used along with the binder for curing the binder. High temperature setting catalysts, for example, benzoyl peroxide (BPO) may also be used for curing the binder. The filler is a fine powder, for example, aluminum trihydrate, calcium carbonate, quartz powder, or a combination thereof. The use of aluminum trihydrate as a filler makes the artificial stone laminate fire resistant.

The composite 201 described herein is, for example, a fiber reinforced plastic laminate, an artificial stone laminate or any other laminate that requires ornamental patterns and that is manufactured using the resin transfer molding process. The artificial stone laminate is thin, flexible, and lightweight and is used as an architectural surfacing material. Examples of the application of the artificial stone laminate comprise surfacing of kitchen countertops, wall claddings, doors, tabletops, wardrobes, shelves, work-tops, counters, wall linings, column claddings, storage units, lift linings, store fittings, displays, vanity units, cubicles, check out desks, office partitions, and other home and office furniture.

The foregoing examples have been provided merely for the purpose of explanation and are in no way to be construed as limiting of the invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method for decorating a composite placed in a mold in a resin transfer molding process, comprising:
    selectively depositing unbonded pigments on one or more areas of a preform of said composite;
    applying a vacuum to said mold; and
    injecting a resin into said mold for enabling a process of vacuum assisted resin transfer molding, wherein said resin is injected via one or more resin input ports operably connected to said mold, and wherein said injected resin carries said selectively deposited unbonded pigments on a path on said one or more areas of said perform of said composite along a direction of flow of said injected resin;
    whereby ornamental pigment flow patterns are created in said composite for decorating said composite.

2. The method of claim 1, wherein said composite is an artificial stone fiber composite comprising quartz particulates, glass particulates, fillers, and a polyester binder.

3. The method of claim 1, wherein said vacuum is selectively applied through one or more vacuum ports selectively positioned over said composite in said mold, during said flow of said injected resin that carries said selectively deposited unbonded pigments on said path on said one or more areas of said preform of said composite, for creating different said ornamental pigment flow patterns in said composite.

4. The method of claim 1, further comprising selectively injecting said resin premixed with pigments into said mold at one or different points of time.

5. The method of claim 1, further comprising selectively injecting said resin into said mold via a plurality of resin input ports selectively positioned over said composite in said mold, for creating different said ornamental pigment flow patterns in said composite.

6. A method for creating bands of ornamental pigment flow patterns in a composite placed in a mold, in a resin transfer molding process, comprising:
    depositing unbonded pigments on a transfer medium positioned on a preform of said composite;
    positioning said transfer medium in proximity to one or more resin input ports operably connected to said mold; and
    selectively injecting a resin onto said transfer medium deposited with said unbonded pigments, via said one or more resin input ports for creating said bands of said ornamental pigment flow patterns, wherein said injected resin carries said deposited unbonded pigments on a path on said perform of said composite along a direction of flow of said injected resin.

7. The method of claim 6, wherein said transfer medium is a glass fiber strip.

* * * * *